United States Patent [19]
Kato

[11] Patent Number: 4,926,540
[45] Date of Patent: May 22, 1990

[54] PROCESS FOR PRODUCING AN ELECTRIC MOTOR

[75] Inventor: Iwao Kato, Nagoya, Japan

[73] Assignee: Brother Kogyo Kabushiki Kaisha, Nagoya, Japan

[21] Appl. No.: 359,152

[22] Filed: May 31, 1989

Related U.S. Application Data

[62] Division of Ser. No. 81,444, Aug. 4, 1987.

[30] Foreign Application Priority Data

Aug. 5, 1986 [JP] Japan .................................. 61-183769

[51] Int. Cl.$^5$ .............................................. H02K 15/08
[52] U.S. Cl. ......................................... 29/596; 29/418; 29/856; 29/883; 310/43; 310/71; 310/257
[58] Field of Search .............. 310/42, 43, 40 MM, 71, 310/194, 263, 261, 257; 29/596, 856, 883, 884, 418

[56] References Cited

U.S. PATENT DOCUMENTS

| | | | |
|---|---|---|---|
| 3,751,697 | 8/1973 | Morley et al. | 310/257 X |
| 3,800,175 | 3/1974 | Plotscher et al. | 310/164 |
| 4,707,627 | 11/1987 | Best | 310/71 |
| 4,714,850 | 12/1987 | Akiba et al. | 310/43 X |

FOREIGN PATENT DOCUMENTS 2151855 7/1985 United Kingdom ......... 310/40 MM

Primary Examiner—Carl E. Hall
Attorney, Agent, or Firm—Jones, Tullar & Cooper

[57] ABSTRACT

A motor is equipped with a magnetic structure, stator assemblies having a non-magnetic molding member for being incorporated in the magnetic structure and coils for being wound on the outer periphery of each stator assembly.

The magnetic structure is provided with magnetic pole plate bodies, a recess provided in each magnetic pole plate body, bridge members incorporated in the magnetic pole plate body in such a manner as to surround the recess and a plurality of terminal elements whose base ends are coupled to the bridge members and whose free ends are extended toward the recess. The recess, together with the free ends of the terminal elements, is filled with the non-magnetic molding member. On the other hand, the bridge members are not embedded with the non-magnetic molding member but are subsequently cut and removed, so that the base ends of the terminal elements are arranged in such a manner as to project from the surface of the non-magnetic molding member.

3 Claims, 5 Drawing Sheets

PROCESS FOR PRODUCING AN ELECTRIC MOTOR

This is a divisional of co-pending application Ser. No. 07/081,444 filed on Aug. 4, 1987.

BACKGROUND OF THE INVENTION

The present invention relates to motors and the process of the producing same, and more specifically to a motor having terminals for use in supplying power to its coils, such that a plurality of terminals are fitted in the state of being insulated to stator assemblies.

The prior art to which the present invention is directed includes the art of motors and motor assemblies being of the sort disclosed by U.S. Pat. Nos. 3,508,091, 4,107,559 and 4,471,246.

Moreover, Japanese Patent No. 28708/62, for instance, is known as one that discloses a motor stator assembly technique.

According to the disclosure of Japanese Patent No. 28708/62, a pair of magnetic pole plates having a plurality of magnetic poles like octopus legs arranged on the circumference of each plate at equal intervals and L-bent in the same direction are vertically combined in such a manner that these opposite magnetic poles alternately maintain equal intervals and non-magnetic material is forced in between both the magnetic pole plates so as to incorporate them in the form of a bobbin. Moreover, the central portion of one magnetic pole plate is filled with the non-magnetic material and a bearing hole in alignment with the center of the surrounding magnetic poles of the magnetic pole plate is bored in the central portion filled with that material so as to pivotally support a permanent magnet rotor in the bearing hole.

In a motor stator of the sort aforementioned, a plurality of terminals for supplying power to the coil wound on the outer periphery thereof have to be installed such that they are insulated from the stator assembly. Conventionally, there has been employed a method of forming the plurality of terminals by insert molding, wherein these terminals are individually molded in or each terminal formed by insert molding is forced into and fixed to part of a mold layer, or the plurality of terminals fitted beforehand as an assembly of terminals are formed by insert molding before being incorporated in the stator.

However, the method of forming each terminal by insert molding or incorporating an assembly of terminals is disadvantageous in that it not only requires complicated molding and assembling facilities but also increases the production cost.

In the case of the method of forcing each terminal into the mold layer, moreover, the terminals tend to fall out because they are hardly firmly fastened thereto.

SUMMARY OF THE INVENTION

The present invention is intended to solve the aforesaid problems inherent in conventional motors and it is therefore an object of the invention to provide such a motor in which a plurality of terminal elements can be readily firmly fixed to the outer periphery of its stator assembly without using special jigs and in which terminal construction can be built solidly and less costly.

In order to accomplish the aforesaid object according to the present invention, magnetic pole means are provided having at least one magnetic pole plate body with a recess formed therein and a plurality of terminal elements disposed in the recess and electrically connected to the ends of a coil, whereas a non-magnetic molded member fills the recess and simultaneously covers one of the ends of the terminal elements so as to hold the terminal elements in the recess.

With the aforesaid arrangement, the recess thus formed prevents the portion where the terminal elements are disposed from projecting from the stator assembly sidewise as well as excessively in the outer peripheral direction thereof, which is advantageous in that the coil can be formed without being restricted by space.

According to the present invention, the magnetic means comprises magnetic pole plate bodies, a recess formed in each magnetic pole plate body, a bridge member, a plurality of terminal elements respectively having base ends and free ends and extending toward the recess, the base ends being coupled to the bridge member. The recess together with the free ends of the terminal elements is filled with a non-magnetic molded member, whereas the bridge member is not covered with the non-magnetic molded member but cut and removed subsequently.

With the aforesaid arrangement, the plurality of terminal elements can be formed by insert molding in the non-magnetic molded member of the recess without the necessity of using special jigs and disposed on the outer periphery of the stator assembly only by subsequently cutting and removing the bridge member, so that a solid inexpensive terminal construction is built.

BRIEF DESCRIPTION OF THE DRAWINGS

The above object, features and advantages of the present invention will be better understood from the following description of the preferred embodiment thereof which is to be read in connection with the accompanying drawings, in which.

DESCRIPTION OF THE PREFERRED EMBODIMENTS

Referring to FIG. 1~FIG. 6, there is illustrated one preferred form of a motor constructed according to the present invention.

Figure 1:
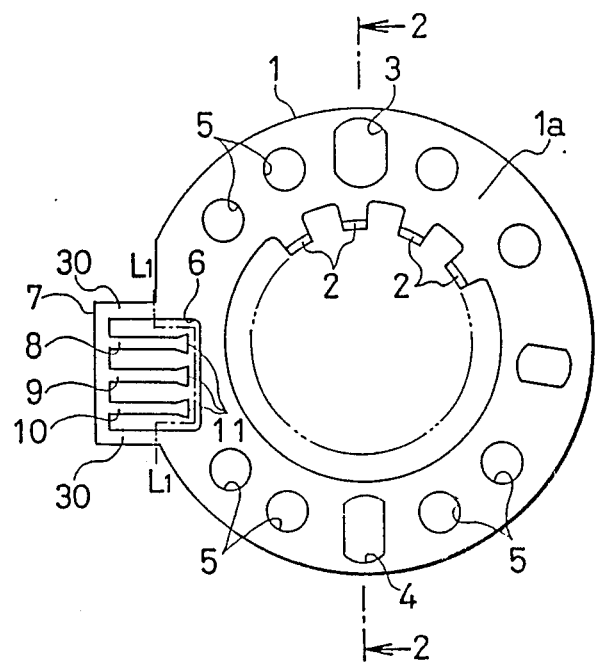
FIG. 1 is an elevational view of a magnetic pole plate for a stator for a pulse motor embodying the present invention.
Figure 2:
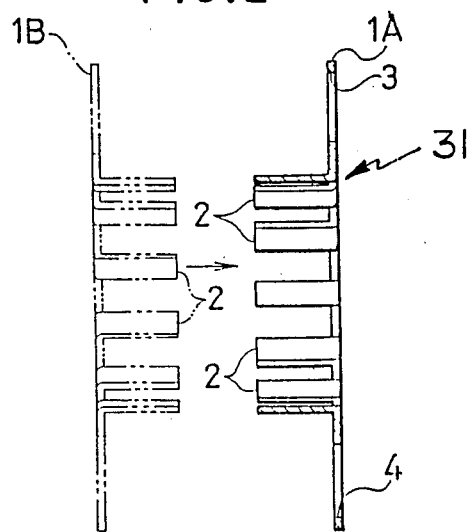
FIG. 2 is a sectional view taken on line 2—2 of FIG. 1.

As shown in FIG. 1 and FIG. 2, a magnetic pole plate 1 for use in a pulse motor embodying the present invention has a magnetic pole plate body 1a formed as a disc by a press and a plurality of parallel magnetic poles 2 disposed on the same circumference at equal intervals and bent perpendicularly to the plate body 1a. There are formed a pair of substantially oval-shaped apertures 3, 4 and a plurality of small circular holes 5 in the periphery of the magnetic pole plate body 1a.

A recess 6 is formed on the outer periphery of the magnetic pole plate body 1a and a pair of projections 30 outwardly extending from the magnetic pole plate body 1a are also formed at the end of its opening, a bridge piece 7 integrally joining the front ends of both the projections 30. The bridge piece 7 also incorporates three parallel terminals 8, 9, and 10 on its inside in such a manner as to place the terminals at fixed intervals with respect to the center of the magnetic pole plate body 1a but separate from the periphery thereof, the front end of each terminal having a wide head 11 for preventing the terminals from falling off.

In this embodiment, a set of two magnetic pole plates 1 thus constructed constitutes a stator fitting as a magnetic pole means. Needless to say, the stator fitting may be composed of one magnetic pole plate. The one magnetic pole plate 1A is used in such a state that the terminals 8~10 remain as they are, whereas the other plate 1B is used in such a state that the terminals 8~10 are cut on line L1—L1 of FIG. 1 and removed.

Figure 3:
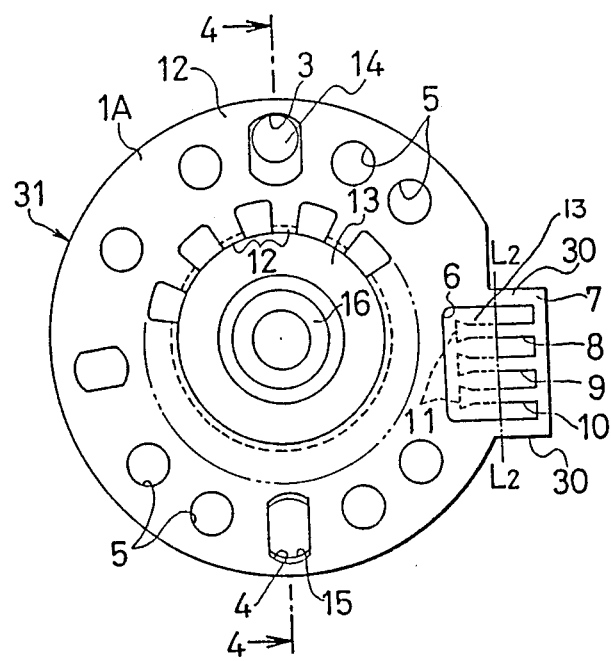
FIG. 3 is a rear elevational view of a stator with the magnetic pole plate of FIG. 1 formed by insert molding.
Figure 4:
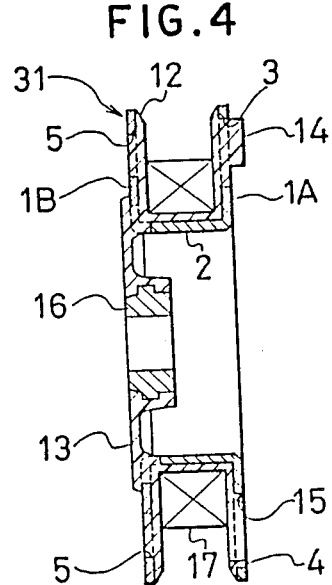
FIG. 4 is a sectional view taken on line 4—4 of FIG. 3.

As shown in FIG. 2, the stator fitting 31 is arranged so that the two magnetic pole plates 1A, 1B as a set are incorporated by insert molding with a non-magnetic molded member such as synthetic resin in such a state that the opposite magnetic poles 2 are alternately laid up at equal intervals and, as shown in FIGS. 3 and 4, formed into a bobbin-shaped stator assembly. At this time, there is integrally formed a resin layer, 13 extending from the inner sides of the magnetic pole plates 1A, 1B over the apertures 3, 4 and the small holes 5. A mating projection 14 and a mating hole 15 are formed in the apertures 3, 4 of the magnetic pole plate 1A on one side, whereas a bearing member 16 is embedded and fixed in the resin layer 13 in the center of the magnetic pole plate 1B on the other side.

As shown in FIG. 3, the resin layer 13 is also formed by insert molding in the recess 6 of the magnetic pole plate 1A and the front ends of the terminals 8~10 are embedded and fixed in the resin layer 13. When both the projections 30 and the base ends of the terminals 8~10 are cut along line L2—L2 subsequently as shown in FIG. 3 to remove the projections 30 together with the bridge piece 7, the three terminals 8~10 are exposed on the outer periphery of the stator assembly 12. Since the terminals 8~10 respectively have the wide heads 11 embedded and solidly fixed in the resin layer 13 of the recess 6, they are unlikely to shake or fall off.

Figure 5:
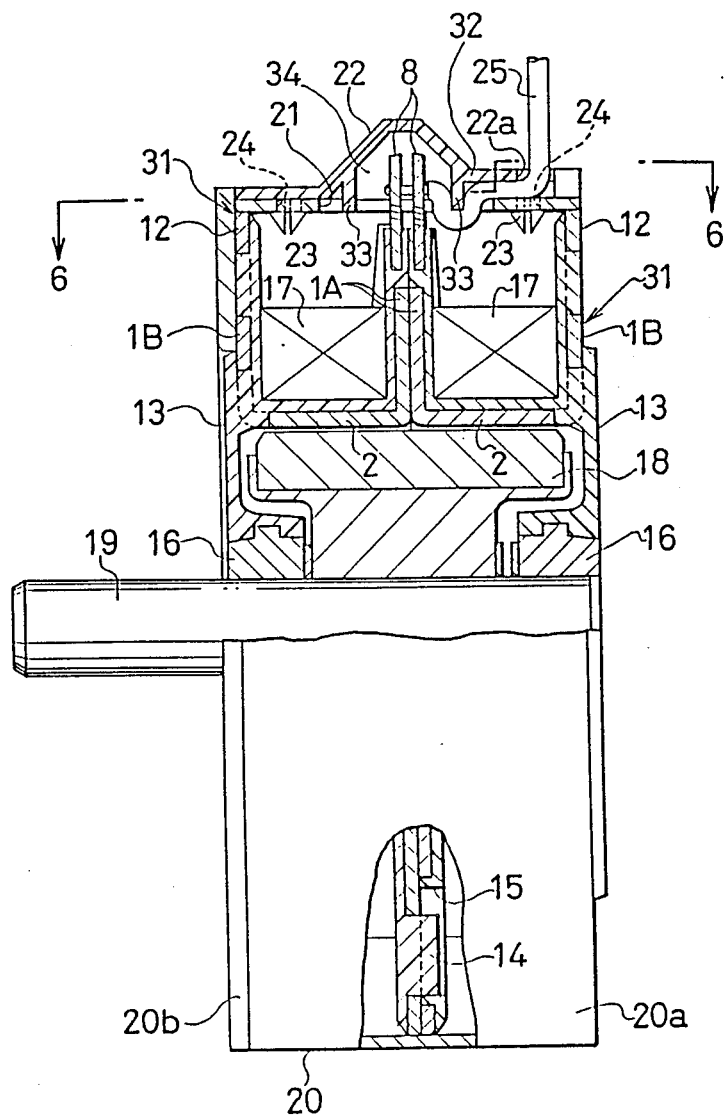
FIG. 5 is a broken side view showing the construction of the pulse motor incorporating the stator of FIG. 3.
Figure 6:
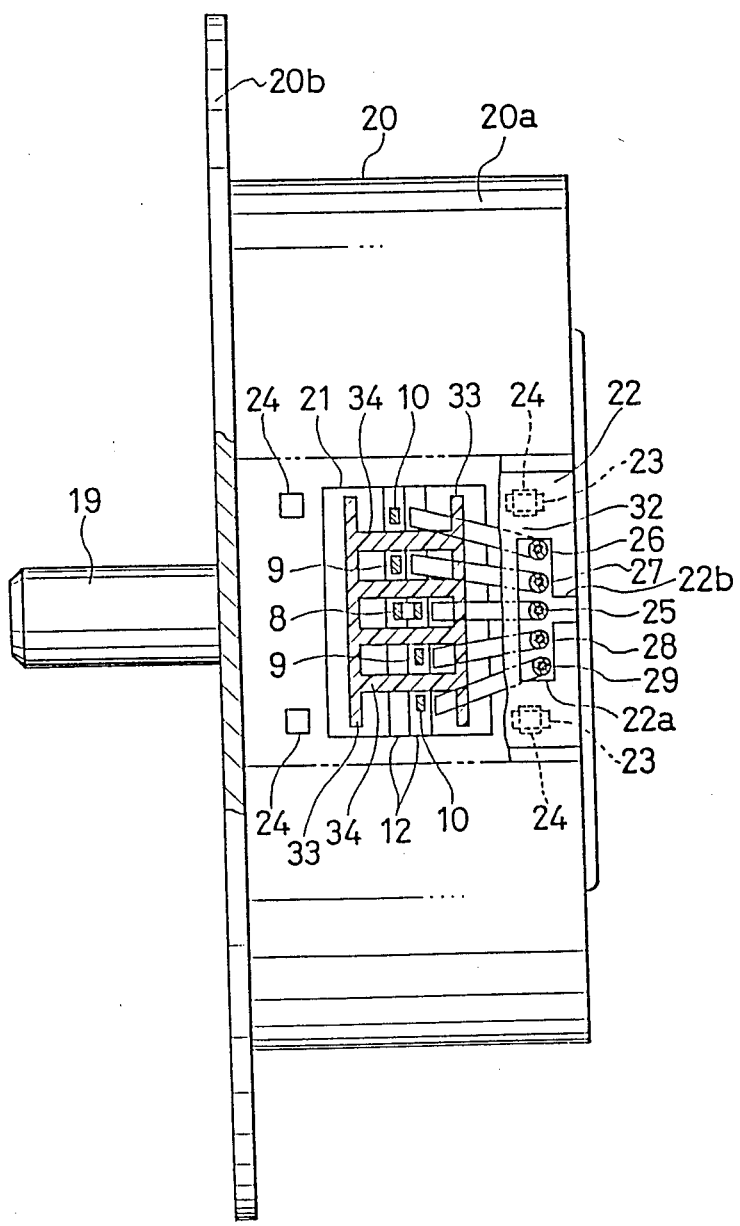
FIG. 6 is a sectional view taken on line 6—6 of FIG. 5.

A coil 17 is wound on the outer periphery of the bobbin-shaped stator assembly 12 thus constructed. Two of the stator assemblies 12 are combined together by fitting each mating projection 14 into the mating hole 15 and the groups of terminals 8~10 of both stator assemblies are set adjacent to each other, while at the same time, e.g., the terminal 8 in each group is arranged as a common terminal and set adjacent to its counterpart. Moreover, the rotary shaft 19 of a rotor 18 is rotatably supported between both bearing members 16 (FIG. 5). One end of each coil 17 is respectively connected to the terminals 8, the other end of each coil is respectively connected to the remaining terminals 9, 10. In order to supply power to each coil 17, a lead 25 is connected to the two common terminals 8, whereas leads 26, 27, 28, 29 are respectively connected to the remaining pair of terminals 9, 10.

Both stator assemblies 12 are contained in assembly and fixed in a motor cover 20, which is composed of a cylindrical body 20a and a side plate 20b supporting the body 20a.

An opening 21 for leading out the leads 25~29 corresponding to the terminals 8~10 on the stator assemblies is formed on the outside of the cylindrical body 20a and four mating holes 24 are formed on the outside of the opening edge. Four mating projections 23 on the underside of a lid 22 are mated with the mating holes 24 to fit the lid 22 to the cylindrical body 20a in such a manner as to cover the opening 21. A holding part 32 is provided on one side of the lid 22 to hold the leads 25~29 between the holding part 32 and the cylindrical body 20a in the proximity of their connections with the respective terminals 8~10. A pair of parallel protrusions 33 are formed beneath the lid 22 on both sides of the terminals 8~10, one of the protrusions 33 being employed to bend the leads 25~29 toward the center of the motor in between the terminals and the holding part 32. There are formed four partition walls 34 located among the respective terminals 8~10 between both the protrusions 33 to individually isolate the terminals. An outlet 22a is formed in the side edge of the lid 22, with an insertion port 22b provided in part of the outlet 22a and used to insert the leads 25~29 into the outlet 22a, and the leads 25~29 are led out from the outlet 22a.

In this embodiment of the pulse motor, the plurality of terminals 8~10 are incorporated by press molding in the desired position of the outer periphery of the magnetic pole plate 1A and the front ends of the terminals 8~10 can simultaneously be embedded and fixed by insert molding in the resin layer 13 of the recess 6. Accordingly, the projected terminals 8~10 for supplying power are readily disposed on the outer periphery of the stator assembly 12 only by cutting and removing the projections 30 and the bridge piece 7.

In the embodiment of a pulse motor, while the leads 25~29 extending from the opening 21 to the outside of the motor cover 20 are inserted from the insertion port 22b of the lid 22 into the outlet 22a, and sightly slackened, the lid is fitted to the motor cover 20 by mating the projections 23 with the holes 24. Consequently, as shown in FIG. 5, the leads 25~29 are held between the holding part 32 of the lid 22 and the outer peripheral face of the motor cover 20, and bent by the protrusions 33 toward the center of the motor in between the position where they are held and the terminals 8~10. Accordingly, the leads 25~29 can solidly be fixed to the motor cover 20 in the proximity of their connections with the terminals 8~10 without troublesome anchoring work using tapes, etc., whereas even if tensile force is applied to the leads 25~29 in any directions, it will never be transmitted to the aforesaid connections.

The lid 22 provided with the partition walls 34 for isolating each terminal as in the case of this embodiment prevents, e.g., the terminal 10, even if it is bent by the tensile force applied, from coming in contact with the other terminals 8, 9.

In this embodiment, since the ends of the coils 17 extend over and are wound around the two terminals 8 arranged close to each other in layers they are connected to the terminals to provide common terminals, it is unnecessary to connect the ends of the coils to the terminals 8 respectively and to install a relay plate held between the terminals, as contrasted with the case where both the terminals 8 are arranged separately.

Figure 7:
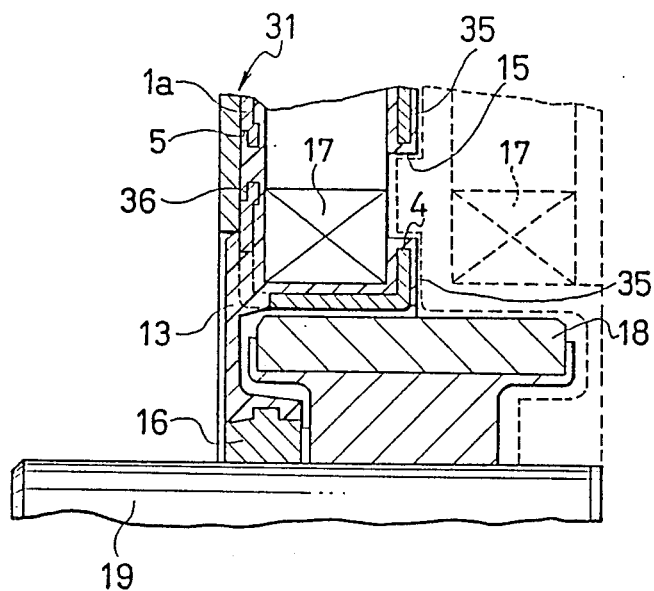
FIGS. 7 and 8 are enlarged sectional views showing the principal parts of another pulse motor embodying the present invention, respectively.
Figure 8:
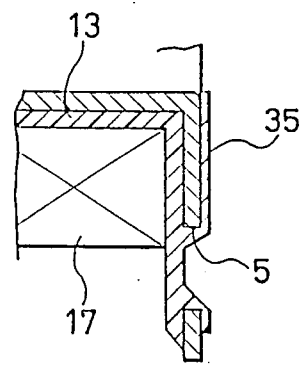

FIG. 7 and FIG. 8 show another embodiment of the present invention, respectively. In the embodiment of FIG. 7, there is shown the enlarged proximity of the rotor 18, wherein the resin layer 13 is extended from the mating hole 15 up to the surface of the stator fitting 31 to form an annular separation layer 35 so as to cover its side facing the other stator fitting (indicated by a broken line). The separation layer 35 allows the one stator fitting to be magnetically separated from the other, so that the motor is operated stably.

Dust penetrated into the stator assembly 12 impedes the rotation of the rotor 18 and the separation layer 35 has the effect of preventing the penetration of dust. Moreover, because the separation layer 35 together with the resin layer inside the stator fitting 31 forms a U-shaped part in cross section, the U-shaped part mates with the end of the stator fitting 31, whereby the resin layer 13 is prevented from separating from the stator fitting 31. The separation layer 35 is, as shown in FIG. 8, also provided in the small hole 5 made opposite to the other stator fitting and has the same effect as described above.

On the other hand, a recess 36 is provided in the magnetic pole plate body 1a in such a manner that it is recessed from the surface of the stator fitting 31 in the region of the small hole 5 on the opposite side of the other stator fitting and the resin layer 13 communicating with the inside of the stator fitting 31 is also laid in the recess 36. With this arrangement, the resin layer 13 is prevented from separating from the stator fitting 31 as in the case of the mating hole 15.

What is claimed is:

1. A process of producing a motor having at least two stator assemblies, each including magnetic means and a non-magnetic molded member incorporated in said magnetic means, coils wound on the outer periphery of said stator assemblies, and a rotor rotating within said stator assemblies, said process comprising the steps of:

forming said magnetic means to have magnetic pole plate bodies, a recess formed in at least one of said magnetic pole plate bodies, a bridge member incorporated in said at least one of said magnetic pole plate bodies in such a manner as to close said recess, a plurality of terminal elements respectively having base ends and free ends with the base ends being coupled to said bridge member and the free ends extending into and toward said recess;

molding said stator assemblies by filling said recess of said magnetic means, together with the free ends of said terminal elements, with said non-magnetic molded member;

projecting the base ends of said terminal elements from the surface of said non-magnetic molded member by cutting and removing said bridge member of said stator assembly; and winding said coils on said stator assemblies and electrically connecting the ends thereof to the projections of said terminal elements.

2. A process of producing a motor as claimed in claim 1, wherein said magnetic means includes one magnetic pole plate body having said recess, said bridge and said terminal element structure and another magnetic pole plate body not having said recess, said bridge and said terminal element structure.

3. A process of producing a motor as claimed in claim 1, wherein at least a pair of apertures are provided in the periphery of said magnetic pole plate body, wherein said non-magnetic molded member has a mating projection at one aperture and a mating hole at the other, and wherein two of said stator assemblies are combined together in the direction of the rotary shaft of said rotor by fitting said mating projection into said matting hole.

* * * * *